United States Patent [19]
Wei

[11] Patent Number: 5,433,511
[45] Date of Patent: Jul. 18, 1995

[54] CAST WHEEL REINFORCED WITH A METAL MATRIX COMPOSITE

[75] Inventor: Daniel C. Wei, Ann Arbor, Mich.

[73] Assignee: Hayes Wheels International, Inc., Romulus, Mich.

[21] Appl. No.: 133,690

[22] Filed: Oct. 7, 1993

[51] Int. Cl.6 .............................................. B60B 3/06
[52] U.S. Cl. ..................................... 301/65; 301/64.3; 164/98
[58] Field of Search ............... 301/62, 63.1, 64.2, 301/64.3, 64.7, 65; 164/91, 98, DIG. 14; 295/8

[56] References Cited

U.S. PATENT DOCUMENTS

| | | | |
|---|---|---|---|
| 2,008,933 | 7/1935 | Sinclair | 301/65 X |
| 2,091,602 | 8/1937 | Le Jeune | 301/65 X |
| 3,528,706 | 9/1970 | Bauer . | |
| 3,790,219 | 2/1974 | Watts | 301/64.3 |
| 3,993,356 | 11/1976 | Groff et al. | 301/64.3 X |
| 4,000,926 | 1/1977 | Wilcox | 301/64.3 |
| 4,082,864 | 4/1978 | Kendall et al. . | |
| 4,318,438 | 3/1982 | Ban et al. . | |
| 4,546,048 | 10/1985 | Guenther | 164/98 X |
| 4,617,979 | 10/1986 | Suzuki et al. . | |
| 4,705,093 | 11/1987 | Ogino . | |
| 4,706,550 | 11/1987 | Bullat . | |
| 4,766,944 | 8/1988 | Sakuma et al. . | |
| 4,899,800 | 2/1990 | Gallerneault et al. . | |
| 4,920,864 | 5/1990 | Skingle et al. . | |
| 4,980,123 | 12/1990 | Gedeon et al. . | |
| 4,995,444 | 2/1991 | Jolly et al. . | |
| 5,004,034 | 4/1991 | Park et al. | 164/98 X |
| 5,004,036 | 4/1991 | Becker | 164/98 X |
| 5,031,966 | 7/1991 | Oakey | 301/37.1 |
| 5,052,464 | 10/1991 | Natori . | |
| 5,113,925 | 5/1992 | Cook | 164/98 X |
| 5,311,920 | 5/1994 | Cook | 164/98 X |
| 5,337,803 | 8/1994 | Divecha et al. | 164/98 |

Primary Examiner—Russell D. Stormer
Attorney, Agent, or Firm—MacMillan, Sobanski & Todd

[57] ABSTRACT

A light weight cast metal wheel having a disk-shaped wheel disk formed across an annular wheel rim and including a reinforcing layer of a metal matrix composite extending radially across the wheel disk. The reinforcing layer also can extend axially across a portion of the wheel rim. The metal matrix composite layer is formed by securing a preform formed from a reinforcing material within the wheel mold prior to casting the wheel. The use of a preform assures that the resulting reinforcing layer is uniform.

16 Claims, 10 Drawing Sheets

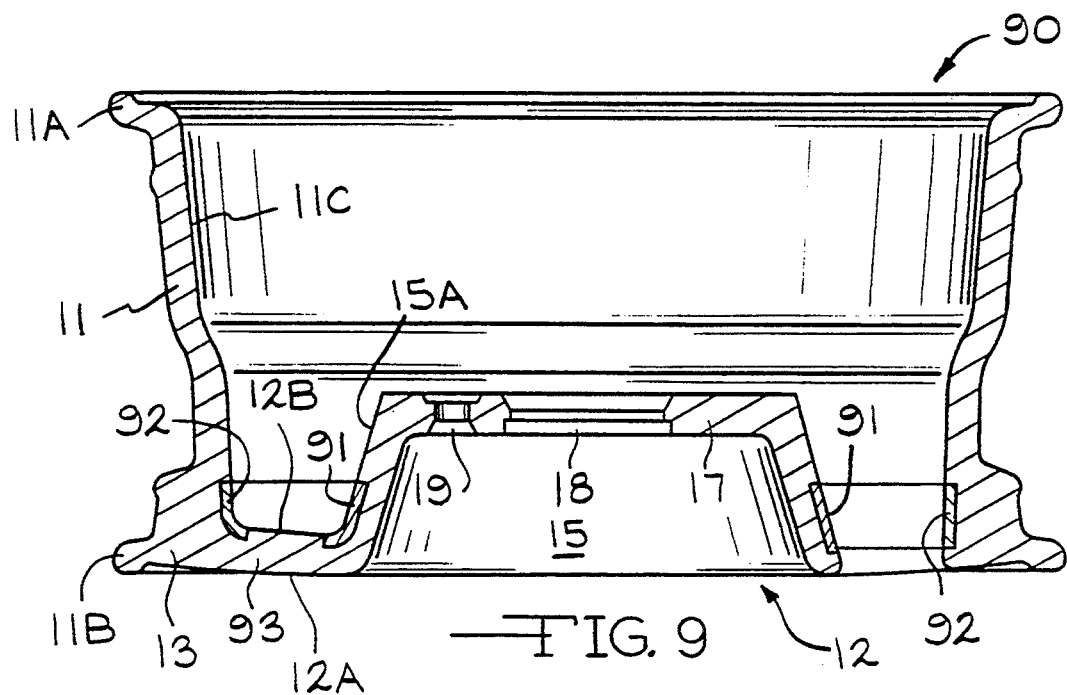
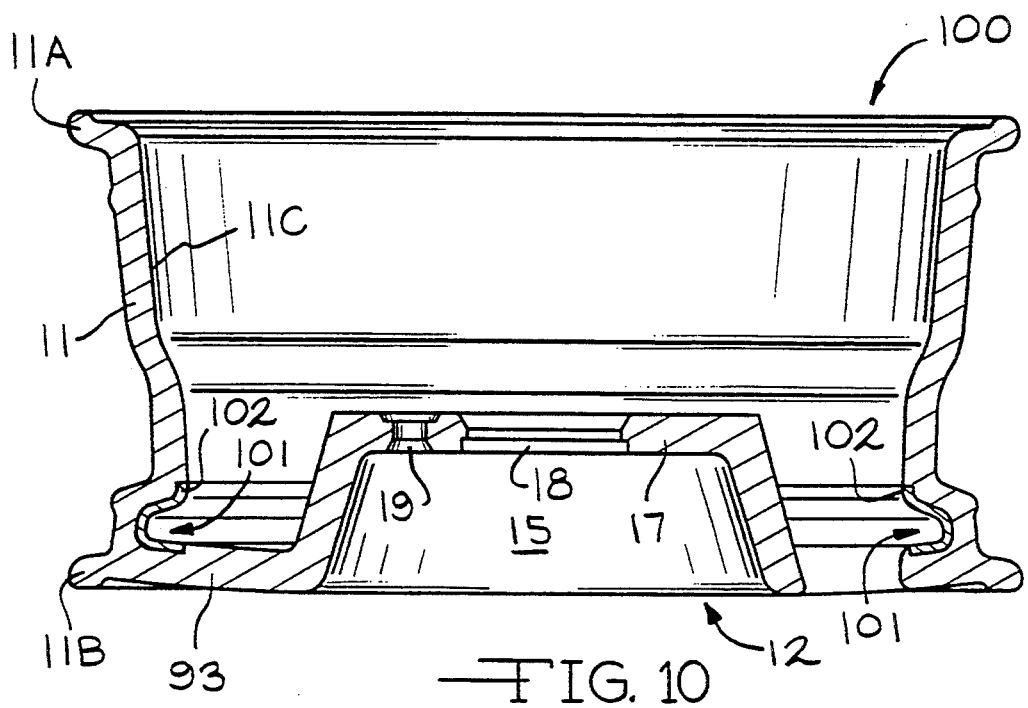

CAST WHEEL REINFORCED WITH A METAL MATRIX COMPOSITE

BACKGROUND OF THE INVENTION

This invention relates in general to cast light weight vehicle wheels and in particular to a cast wheel having a reinforced portion comprising a metal matrix composite.

Light weight vehicle wheels formed from a light weight metal, such as aluminum, magnesium or titanium, or an alloy thereof, are replacing all-steel wheels on an increasing number of vehicles. Such light weight wheels provide both a reduction in weight from all-steel wheels and an attractive appearance.

Referring now to the drawings, there is illustrated in FIG. 1 a perspective view of a typical cast vehicle wheel, indicated generally at 10, which is formed in accordance with the prior art. The prior art wheel 10 includes an annular wheel rim 11 which is adapted to carry a vehicle tire (not shown). The wheel rim 11 has an axial inner end 11A which is adjacent to the vehicle (not shown) when the wheel 10 is mounted thereon and an axial outer end 11B opposite from the inner end 11A.

The wheel 10 further includes a circular wheel disk 12 formed across the outer end 11B of the wheel rim 11. The wheel disk 12 has an outer surface 12A which is visible when the wheel 10 is mounted upon the vehicle. Accordingly, the outer disk surface 12A is typically machined to a smooth finish and/or decorated. The wheel disk 12 also has an inner surface 12B which is not visible when the wheel 10 is mounted upon the vehicle. The wheel disk 12 includes an outer ring-shaped sidewall 13 which is formed integrally with the outer end 11B of the wheel rim 11. The sidewall 13 is connected by a plurality of radial spokes 14 to a central wheel hub 15. The spokes 14 define a plurality of openings 16 formed through the wheel disk 12. The openings 16 allow a flow of cooling air to the vehicle brakes while reducing the weight of the wheel 10.

The hub 15 includes a recessed center portion 17 having a large central aperture 18 formed therethrough which can receive the end of a vehicle axle (not shown). The recessed center portion 17 includes a plurality of smaller apertures 19 formed therethrough and spaced equally about the central aperture 18. These smaller apertures 19 receive threaded wheel lugs (not shown) for securing the wheel 10 upon a vehicle.

Because light weight metals typically have a lower strength and Young's modulus than steel, the wheel spokes 14 are usually cast with a thick cross section to provide sufficient strength to support the vehicle, as illustrated in FIG. 2. As best seen in FIG. 3, a pair of reinforcing ribs 20 and 21 are formed on the inner surface of each spoke 14 to provide additional strength to the wheel 10. The reinforcing ribs 20 and 21 extend along the spokes 14 from the wheel rim 11 to the wheel hub 15. While two ribs 20 and 21 are illustrated, a single heavy rib (not shown) also can be used. The thick wheel spokes and reinforcing ribs increase the weight of the cast wheels.

Another technique known in the art for strengthening cast metal articles involves including a metal matrix composite in the casting to reinforce the article. U.S. Pat. No. 4,617,979 discloses a method for doing this which consists of first mixing an inorganic fibrous reinforcing material into the molten metal to form a molten mixture which is then introduced into a mold to cast the article. Upon cooling, a metal matrix composite which includes the casting metal and the reinforcing material is formed and extends throughout the entire article.

U.S. Pat. No. 4,920,864 discloses a melt infiltration technique for casting a piston having a portion of the piston crown formed from a metal matrix composite to reduce cracking induced by thermal cycling. According to the patent, a preformed disk of fibrous material having interstices between the individual fibers is positioned in the piston mold. During the casting process, molten metal is forced under pressure into the interstices in the disk to form a metal matrix composite. Similarly, U.S. Pat. No. 4,705,093 discloses a method for casting a fiber reinforced brake caliper, wherein the reinforcing fibers are contained in the bridge portion of the caliper.

SUMMARY OF THE INVENTION

This invention relates to an improved light-weight cast wheel having a portion which includes a reinforcing layer consisting of a metal matrix composite and a method for forming same.

The present invention is directed toward a cast wheel which has a MMC reinforcing layer formed from a combination of the wheel metal and a reinforcing material. Typical reinforcing materials include silicon carbide, alumina, silica or graphite. The reinforcing material can be in the form of continuous fibers, whiskers, particulates or a foam.

In the preferred embodiment of the invention, the reinforcing layer forms a portion of an inner surface of the wheel. When formed on the inner surface of the wheel disk, the reinforcing layer can increase the strength and Young's Modulus of the wheel spokes, eliminating the need to form reinforcing ribs thereon. The inclusion of a reinforcing layer also allows a reduction in the wheel thickness. The elimination of the reinforcing ribs and reduction of thickness results in a stronger, thinner wheel which weighs less than prior art wheel designs.

When the reinforcing layer is formed on an inner wheel surface or embedded within the wheel, the outer surface of the wheel consists only of the casting metal. This allows the face of the wheel disk to be easily machined to enhance the aesthetic appearance of the wheel. In alternate embodiments, the reinforcing layer is embedded within, or forms an exterior surface of, the wheel.

The method for producing an improved wheel includes forming a preform that includes the reinforcing material. The preform is shaped to conform to the portion of the wheel casting desired to be reinforced. The use of a preform assures uniformity of the resulting reinforcing layer and controls the portion of the wheel containing the MMC layer. The preform can be initially coated with molten casting metal.

The preform is positioned and secured within a wheel mold assembly used to form the wheel casting. Molten metal is then introduced into the mold by means of a conventional casting technique. The molten metal combines with the preform to form a reinforcing layer of a metal matrix composite. After the wheel casting has sufficiently cooled, the casting is removed from the mold assembly. Conventional machining and heat treating operations are then applied to finish the casting.

Various objects and advantages of this invention will become apparent to those skilled in the art from the

BRIEF DESCRIPTION OF THE DRAWINGS

FIG. 9 is a sectional view of another embodiment of the wheel shown in FIG. 4.

FIG. 10 is a sectional view of another embodiment of the wheel shown in FIG. 4 which includes a annular recess formed in an interior surface.

DETAILED DESCRIPTION OF THE PREFERRED EMBODIMENT

Figure 1:
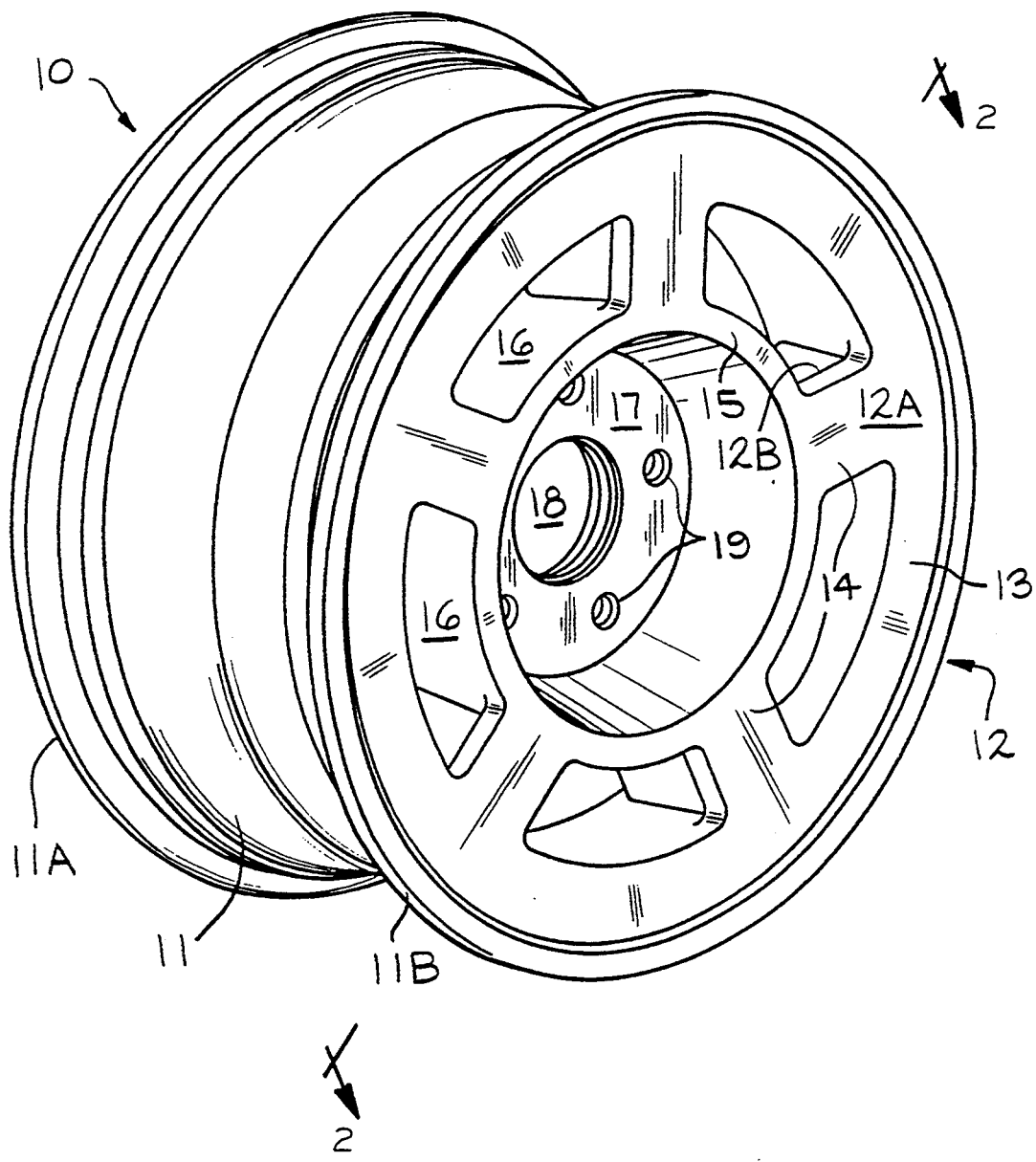
FIG. 1 is a perspective view of a cast vehicle wheel in accordance with the prior art.
Figure 2:
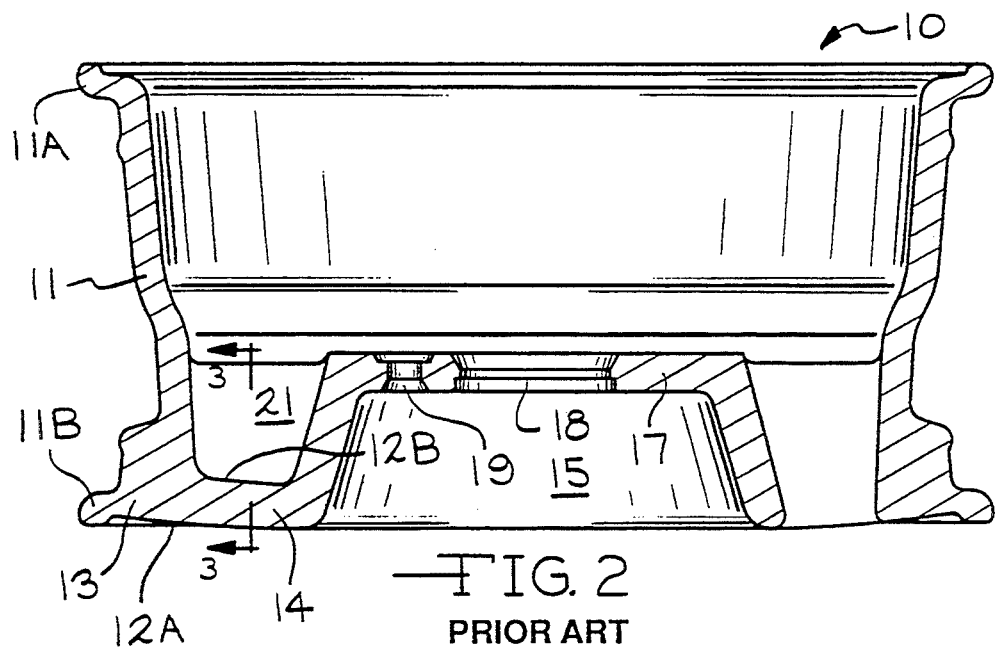
FIG. 2 is a sectional view of the prior art wheel taken along line 2—2 in FIG. 1.
Figure 3:
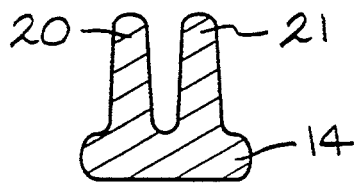
FIG. 3 is a sectional view of a prior art wheel spoke taken along line 3—3 in FIG. 2.
Figure 4:
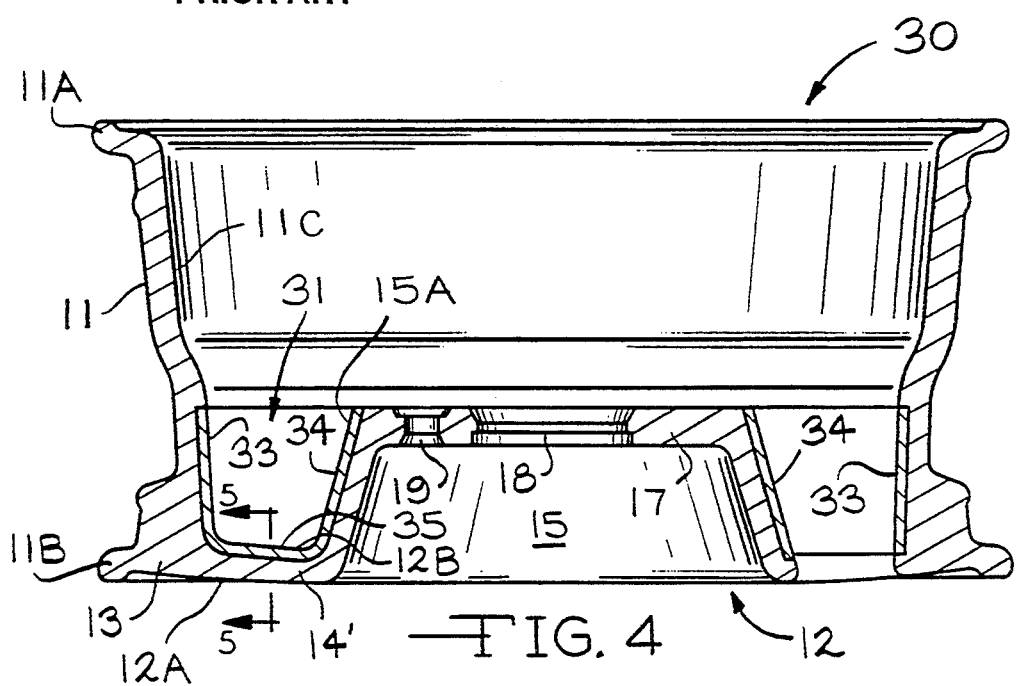
FIG. 4 is a sectional view of a cast wheel formed in accordance with this invention to include an interior surface layer of reinforcing material.

Referring again to the drawings, there is shown in FIG. 4 a sectional view of an improved cast wheel 30 formed in accordance with the invention. Elements of the improved wheel 30 which are similar to corresponding elements of the prior art wheel 10 in FIG. 2 are denoted by the same reference numerals in FIG. 4. Furthermore, as used in this description and the following claims, the term "wheel" includes not only a one-piece cast wheel, but also a cast component of a multi-piece wheel. Thus, while FIG. 4 shows a cast "one piece" wheel, the invention can be practiced upon only a cast component of a multi-piece wheel such as, for example, a center spider portion (not shown), which is then secured to a separately formed rim (not shown) in a known manner to form a finished wheel. As will be described below, the cast component can also be the full front face of a wheel which is subsequently secured to a formed partial wheel rim.

The improved wheel 30 is cast from aluminum, magnesium, titanium, or an alloy thereof and includes an annular wheel rim 11 which is adapted to carry a vehicle tire (not shown). The wheel rim 11 has an axial inner end 11A which is adjacent to the vehicle (not shown) when the wheel 30 is mounted thereon, an axial outer end 11B opposite from the inner end 11A and an inner surface 11C. The wheel 30 further includes a circular wheel disk 12 formed across the wheel rim outer end 11B. The wheel disk has an outer surface 12A which is visible when the wheel 30 is mounted upon the vehicle and an inner surface 12B which is not visible when the wheel 30 is mounted upon the vehicle.

The wheel disk 12 includes an outer ring-shaped sidewall 13 which is formed integrally with the outer end 11B of the wheel rim 11. The sidewall 13 is connected by a plurality of radial spokes 14' to a central wheel hub 15. As will be described below, the spokes 14' of the improved wheel 30 are thinner than the spokes 14 of the prior art wheel 10. The hub 15 includes an inner surface 15A and a recessed center portion 17 having a large central aperture 18 formed therethrough which can receive the end of a vehicle axle (not shown). The recessed center portion 17 includes a plurality of smaller apertures 19 formed therethrough and spaced equally about the central aperture 18 for securing the wheel 30 to a vehicle.

Figure 5:
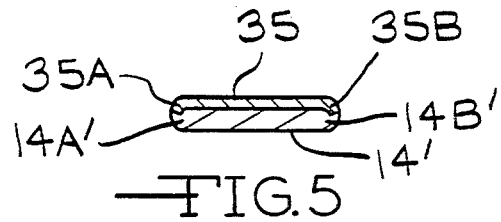
FIG. 5 is a sectional view of a wheel spoke taken along line 5—5 in FIG. 4.

The improved wheel 30 further includes a composite reinforcing layer 31 which is illustrated in FIG. 4 as forming a portion of the inner surface 12B of the wheel disk 12. For the preferred embodiment, the reinforcing layer 31 is formed on the wheel disk inner surface 12B to allow easy machining of the outer disk surface 12A to enhance the aesthetic appearance thereof. As shown in FIG. 4, the reinforcing layer 31 includes a first annular ring portion 33 formed on the inner surface 11C of the wheel rim 11 and extending axially from the wheel disk 12 towards the inner end 11A of the wheel rim 11. The reinforcing layer 31 further includes a second annular ring portion 34 formed on the inner surface 15A of the wheel hub 15. The first and second ring portions 33 and 34 are joined by radial portions 35 of the reinforcing layer 31 formed on the inner surface of the wheel spokes 14'. The shape of the radial portions 35 is best seen in the cross sectional view of a wheel spoke 14' shown in FIG. 5. As shown in FIG. 5, the radial portions 35 include a pair of edges 35A and 35B extending over a portion of each side 14A' and 14B' of the wheel spoke 14'. The radial portions 35 can be formed without the extended edges 35A and 35B, in which case the radial portions 35 are contained entirely on the inner surface of the spokes 14'.

The reinforcing layer 31 consists of a metal matrix composite, or MMC, formed from the metal used to cast the wheel and a reinforcing material. As will be explained below, in the preferred embodiment, the MMC is formed during the casting of the wheel 30 when the molten metal impregnates and wets the reinforcing material. Reinforcing materials used to form the MMC include silicon carbide, alumina, silica and graphite. The reinforcing material can be in the form of continuous fibers, whiskers, particulates or a foam. A particular type and form of reinforcing material is selected in accordance with particular wheel design requirements. The MMC layer 31 is relatively thin, typically extending approximately one eight of an inch (0.32 mm) into the inner surfaces 11C, 12B and 15A of the wheel 30.

The MMC layer 31 significantly increases the strength and Young's Modulus of the wheel disk 12 and the spokes 14'. Tests have shown improved yield, tensile, fatigue and impact strengths for the improved wheel 30 from similar values for the prior art wheel 10. These increased strengths have been found to allow a 30 percent or greater reduction in the thickness of the spokes 14', as best seen in FIG. 5. The increased wheel strength also allows elimination of the reinforcing ribs 20 and 21 formed on the inner surface of the spokes 14 of the prior art wheel 10, as also shown in FIG. 5.

The thinner spokes 14' and omission of reinforcing ribs 20 and 21 significantly reduces the weight of the improved wheel 30. The thinner spokes 14' result in faster cooling of the casting. This produces a finer grain size in the crystalline structure of the wheel disk 12, which also increases the strength thereof.

The increased Young's Modulus provides a greater resistance to development of cracks in the high stress regions of the wheel 30. Such high stress regions include the small radius curves formed where the inner ends of the spokes 14' join the central wheel hub 15 and where the outer ends of the spokes 14' join the sidewall 13. As shown in FIG. 4, these regions are reinforced by the MMC layer 31.

The method used to form the MMC reinforcing layer 31 will now be described. In the preferred embodiment of the invention, the MMC reinforcing layer 31 is formed during the casting of the improved wheel 30. A simplified sectional view of a multi-piece mold assembly for casting the improved wheel 30 is shown generally at 40 in FIG. 6. The individual pieces of the mold assembly 40 are typically formed from cast iron or high carbon steel. The mold assembly 40 includes a base member 41 and two or more retractable side members 42 and 43 which are carried thereon. A removable cup-shaped core member 44 having a stepped cylindrical center portion 45 is disposed within the side mold members 42 and 43.

Figure 6:
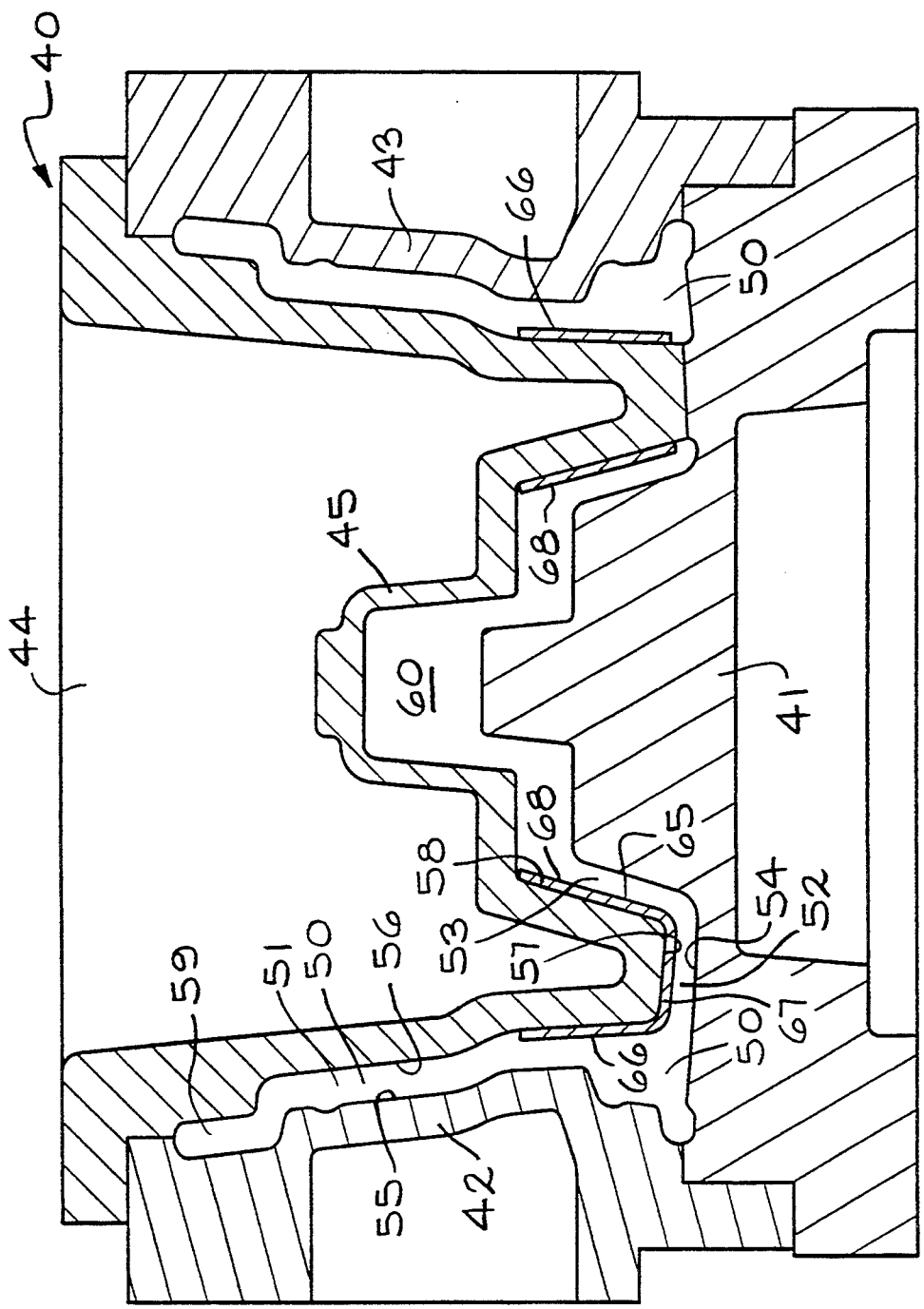
FIG. 6 is a sectional view of a mold and a preform used to cast the wheel shown in FIG. 4.

The mold members 41, 42, 43 and 44, upon assembly, define a mold cavity 50 wherein the wheel 30 is cast. The mold cavity 50 includes an annular rim cavity 51 for casting the wheel rim 11 and a disk cavity 52 for casting the wheel disk 12. The disk cavity 52 further includes a central hub cavity 53 for forming the wheel hub 15. The base member 41 defines an outer surface 54 of the disk cavity 52. Similarly, the side members 42 and 43 define an outer surface 55 of the rim cavity 51. The core member 45 defines an inner surface 56 of the rim cavity 51, an inner surface 57 of the disk cavity 52 and an inner surface 58 of the hub cavity 53. The side members 42 and 43 and the core member 44 further define an annular rim riser cavity 59 formed adjacent to the upper end of the rim cavity 51 as shown in FIG. 6. Similarly, a cylindrical hub riser cavity 60 is formed in the core member center portion 45 above the hub cavity 53.

Figure 7:
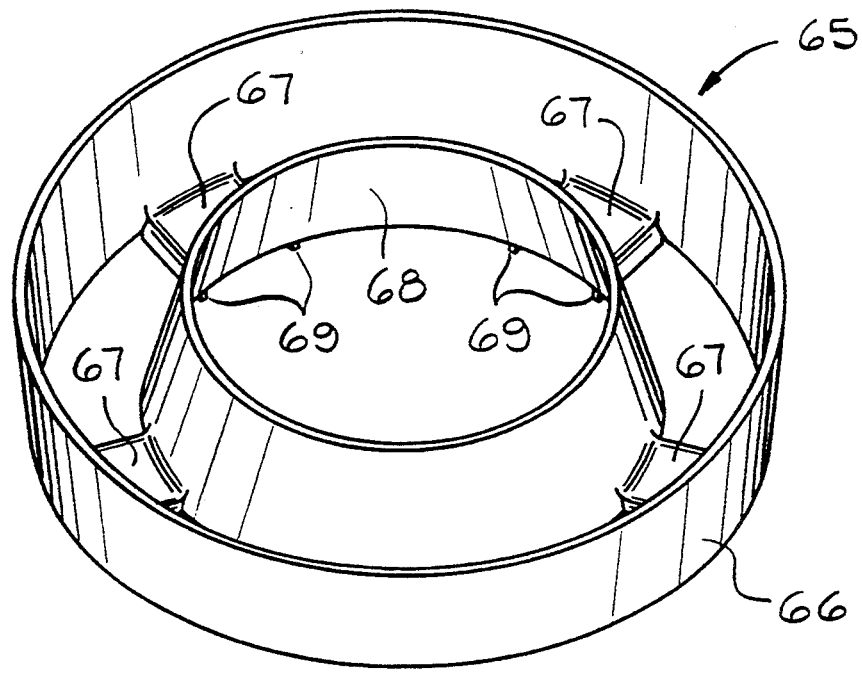
FIG. 7 is a perspective view of the preform shown in FIG. 6.

Prior to casting a wheel, a preform 65 is attached to the bottom of the core member 44 by a mechanical means, such as a groove, a spring or a non-contaminating adhesive (not shown), as shown in FIG. 6. A perspective view of the preform 65 is shown in FIG. 7. The preform 65 is formed from one or more of the reinforcing materials described above by any one of several conventional processes, such as die forming, vacuum forming, stamping or casting. As described above, the reinforcing material used to form the preform 65 can be in the form of particulates, whiskers, fibers or a foam. When fibers are used, the fibers can be spun in a predetermined pattern or allowed to form a random pattern to provide desired reinforcing characteristics. The preform 65 includes numerous interstices formed therein between individual strands or particles of the reinforcing material. The preform 65 also can be prewetted by a conventional method, such as dipping or pressure injection, with the primary metal or alloy being used to form the wheel 30. During the prewetting, molten casting metal infiltrates the interstices in the preform to form a MMC material which is relatively impervious to molten metal.

The preform 65 includes an annular shaped outer portion 66 that conforms to a corresponding portion of the inner surface 56 of the mold rim cavity 51 and the inner surface 57 of the mold disk cavity 52. The preform outer portion 66 is joined by a plurality of spokes 67 to an annular shaped inner portion 68. Each of the preform spokes 67 corresponds to a spoke 14' in the wheel 40 and extends radially across a portion of the inner surface 57 of the disk cavity 52 that forms a wheel spoke 14'. As shown in FIG. 7, the preform spokes 67 include downwardly curving edges 69. The preform inner portion 68 is shaped to conform to a corresponding portion of the inner surface 58 of the hub cavity 53 and the inner surface 57 of the disk cavity 52.

Molten metal is fed by conventional means, such as by gravity, into the mold main cavity 50 through a sprue (not shown). Other casting processes that could be used include low pressure, counter-gravity low pressure, squeeze, pore free, semi-solid, centrifugal, continuous, directional and monocrystal solidification, and die casting. The molten metal flows into the main mold cavity 50 and into contact with the preform 65. The molten metal then fills the rim and hub riser cavities 59 and 60. When the preform 65 is not prewetted, the molten metal in the hub, disk and rim cavities 53, 52 and 51 penetrates the preform interstices and impregnates and wets the preform reinforcing material to form the MMC reinforcing layer 31. When the preform is prewetted, as explained above, the interstices are already filled with the casting metal. Accordingly, the molten metal fuses to the preform 65 to form an integral MMC layer on the surface of the wheel 30. The preform outer ring portion 66 forms the first annular ring portion 33 of the reinforcing layer 31 on the wheel rim inner surface 11C. Similarly, the preform inner ring portion 68 forms the second annular ring portion 34 surrounding the hub 15. The preform spokes 67 form the radial portions 35 of the MMC layer 31 with the curved spoke edges 69 forming the extended edges 35A and 35B of the spoke sides 14A' and 14B' shown in FIG. 5. Use of the preform 65 prevents dispersion of the reinforcing material within the casting to assure formation of a uniform reinforcing layer 31. After the molten metal cools sufficiently, the wheel casting is removed from the mold 40 and machined to a final shape. During the machining, the portions of the casting formed by the rim and hub riser cavities 59 and 60 are removed. The MMC layer 31 is not machined.

Figure 8:
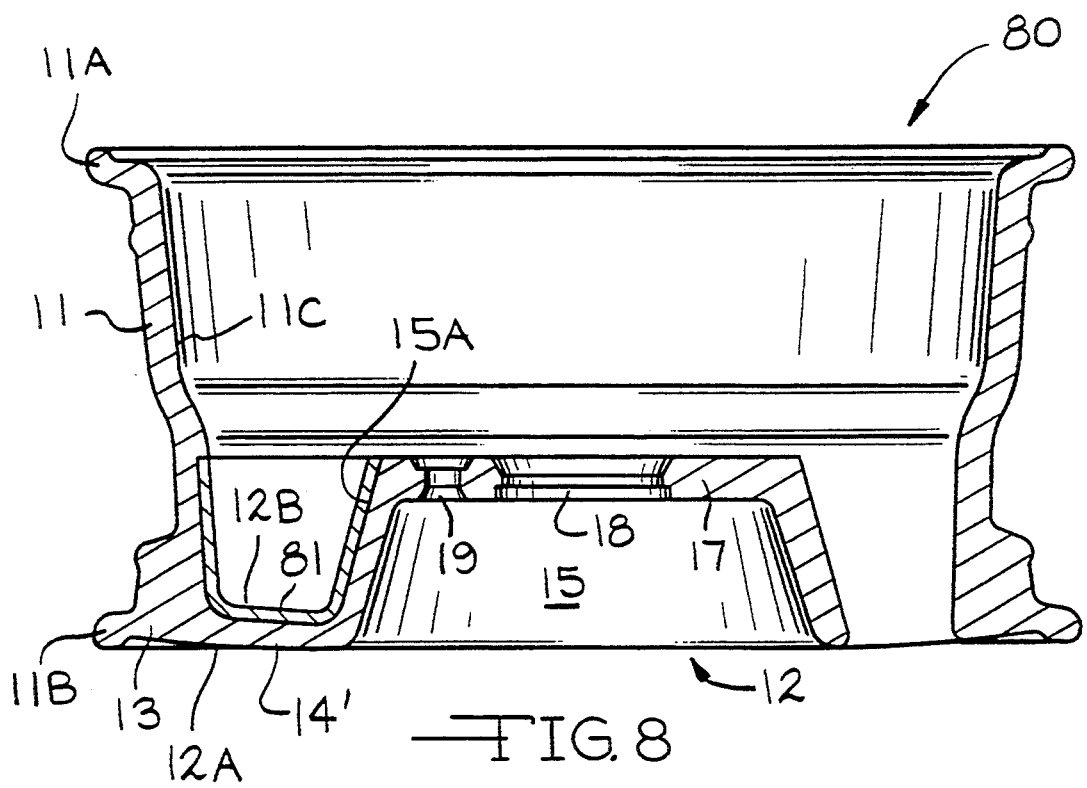
FIG. 8 is a sectional view of an alternate embodiment of the wheel shown in FIG. 4.

An alternate embodiment of the invention is illustrated in the sectional view of an improved wheel 80 shown in FIG. 8. Elements of the improved wheel 80 which are similar to corresponding elements of the improved wheel 30 shown in FIG. 4 are denoted by the same reference numerals in FIG. 8. Likewise, the same reference numerals are used to denote similar elements in the other embodiments described below.

The alternate embodiment of the improved wheel 80 includes a segmented reinforcing MMC layer 81. The MMC layer 81 is located upon the inner surfaces of the wheel spokes 14' and extends only into the surface areas of the rim and hub 11C and 15A which are immediately adjacent to the ends of the wheel spokes 14'. The reinforcing layer 81 does not extend circumferentially around the inner rim surface 11C or the inner surface of the hub 15 between the ends of the spokes 14'. Thus, the reinforcing layer 81 does not include continuous annular inner and outer portions as described above.

A preform consisting of a plurality of identical discrete segments (not shown) is used to form the reinforcing layer 81, with each preform segment corresponding to one of the spokes in the finished wheel 80. The preform segments are secured to the bottom portion of the mold core member 44 which forms the inner surface of the wheel spokes 14'. Casting of the wheel 80 then proceeds as described above.

Another embodiment of the invention is illustrated in the sectional view of an improved wheel 90 shown in FIG. 9. This embodiment includes two reinforcing surface MMC layers 91 and 92 forming concentric inner and outer rings, respectively, around a portion of the inner surface 15A of the hub 15 and the wheel rim inner surface 11C. While the layers 91 and 92 are shown in FIG. 9 as having the same height, it will be appreciated that the heights can be dissimilar. The MMC layers 91 and 92 reinforce two regions of the wheel casting which include small radius curves and are therefore prone to developing cracks. Because the MMC layers 91 and 92 do not extend across the spokes 93, the spokes 93 are thicker than shown in the embodiments of the invention described above.

Two annular preforms of reinforcing material having different diameters (not shown) are used to form the reinforcing layers 91 and 92. The annular preforms have a generally J-shaped cross section and are secured to the bottom portion of the mold core member 44 and casting of the wheel 90 then proceeds as described above.

A fourth embodiment of the invention is illustrated in the sectional view of an improved wheel 100 shown in FIG. 10. The wheel 100 includes an annular recess, or lightener pocket, 101 formed in the wheel inner surface adjacent to the juncture of the wheel rim 11 and disk 12. While the recess 101 is illustrated in FIG. 10 as being formed in an interior surface of the wheel 100, the recess can also be formed in an exterior wheel surface. The recess 101 reduces the wheel weight and can be continuous or formed as a plurality of segments. The wheel 100 includes an annular surface MMC layer 102 formed within the lightener pocket 101. It has been found that the strength of the wheel 100 with the MMC reinforced lightener pocket 101 equals or exceeds that of a similar wheel without a lightener pocket.

The MMC layer 102 is formed by securing an annular shaped preform of reinforcing material (not shown) to the mold core member 44 before casting the wheel 100. The preform includes a U-shaped cross section and is prewetted with the casting metal. As described above, prewetting causes the preform to be relatively impervious to molten metal. When the preform is attached to the mold core member 44, the preform extends into the mold cavity 50, forming a void (not shown) between the core member surface and the preform which defines the lightener pocket 101. When molten metal is introduced into the mold 40, the molten metal fuses with the MMC material comprising the preform. The molten metal does not penetrate the preform to enter the void between the core member 44 and the preform. Thus, the preform cooperates with the mold core member 44 to form the lightener pocket 101 in the improved wheel 100. When the wheel 100 is removed from the mold 40, the preform separates from the mold core member 44 and remains fused to the wheel 100, forming the MMC layer 102 within the lightener pocket 101.

Figure 11:
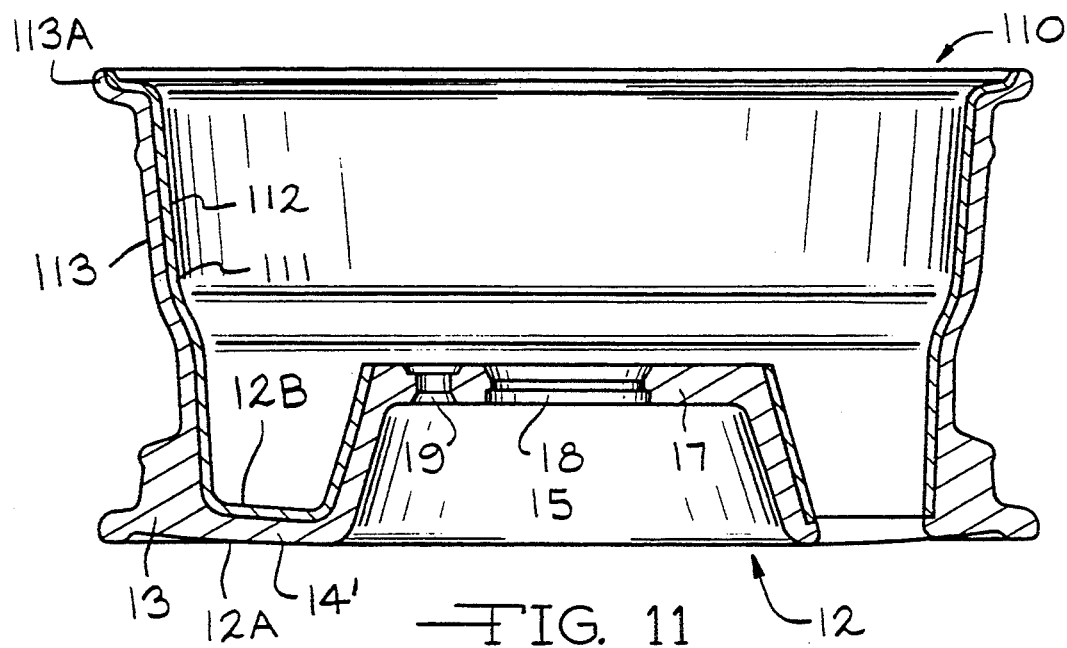
FIG. 11 is a sectional view of another embodiment of the wheel shown in FIG. 4.

A fifth embodiment of the present invention is illustrated in the sectional view of an improved wheel 110 shown in FIG. 11. The wheel 110 includes a MMC layer 111 extending axially upward in FIG. 11 across an inner surface 112 of a wheel rim 113 from the wheel disk 12 to a wheel rim inner end 113A. The MMC layer strengthens the wheel rim 113, allowing formation of a thinner wheel rim 113 and a corresponding reduction in wheel weight from the wheel designs described above. While the embodiment shown in FIG. 11 has the MMC layer extending to the wheel rim inner end 113A, it will be appreciated that the MMC layer can terminate at an intermediate distance between the wheel disk 12 and the rim inner end 113A. A preform of reinforcing material (not shown) used to form the wheel 110 is similar to the preform 65 illustrated in FIG. 7, except that the outer ring portion 66 extends further in an upward direction in FIG. 7. This extended portion is shaped to correspond to the shape of the inner surface 112 of the wheel rim 113.

Figure 12:
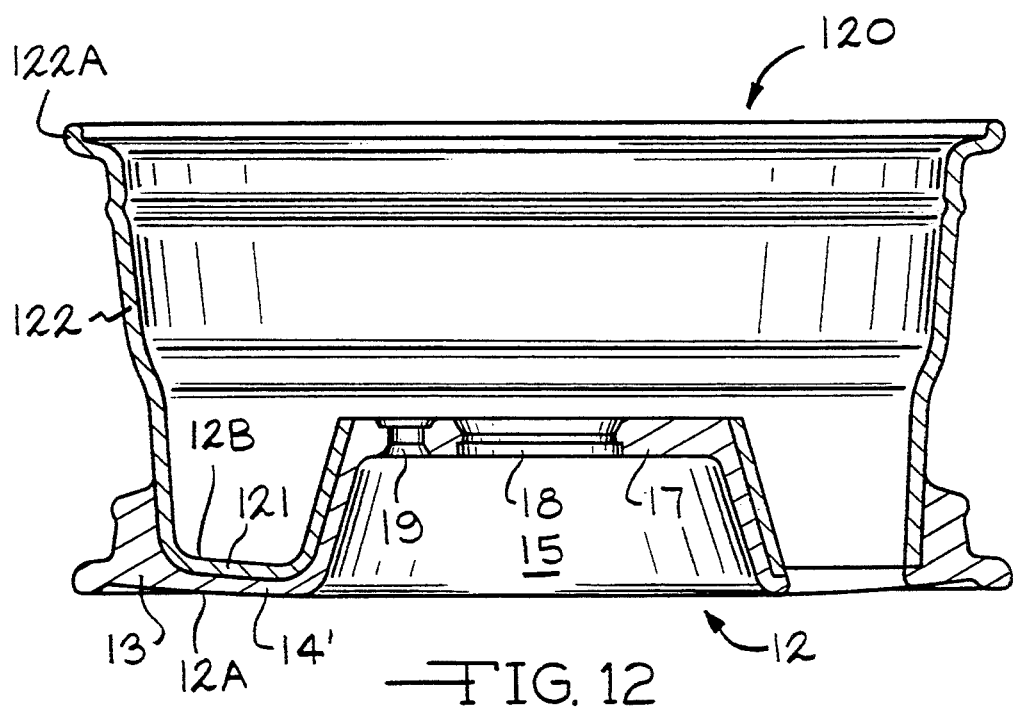
FIG. 12 is a sectional view of another embodiment of the wheel shown in FIG. 4.

A sixth embodiment of the present invention is illustrated in the sectional view of an improved wheel 120 shown in FIG. 12. The wheel 120 includes a MMC layer 121 extending from the wheel hub 15 radially outward across the inner surface of the wheel disk 12 and axially upward in FIG. 12 to form a wheel rim 122. Thus, the wheel rim 122 is formed entirely from MMC material, allowing a further reduction in the thickness of the wheel rim 122 and the wheel weight from the wheel designs described above.

A preform of reinforcing material (not shown) to form the wheel 120 is similar to the preform 65 illustrated in FIG. 7, except that the outer ring portion 66 extends further in an upward direction in FIG. 7. This extended portion is shaped to correspond to the shape of the wheel rim 122. The preform is prewetted with the casting metal by a conventional method, such as dipping or pressure injection. During the prewetting, the metal infiltrates the interstices in the preform to form a MMC material. The preform is attached to the mold core 44 and molten metal poured or injected into any unfilled mold cavities to form the wheel disk 12. The molten metal forming the wheel disk 12 fuses with the preform to form the wheel 120. It is to be appreciated that the preform may not extend fully to the wheel rim inner end 122A. In such a case, the remaining portion of the wheel rim 122 is cast as described above.

Figure 13:
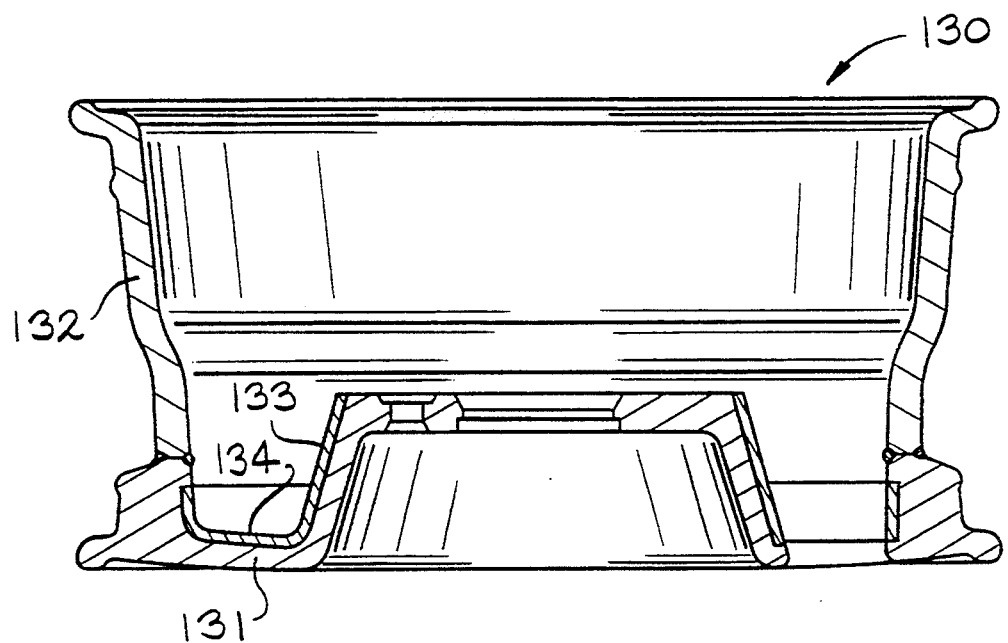
FIG. 13 is a sectional view of a multi-piece wheel which includes a cast wheel disk formed in accordance with this invention.

As explained above, the present invention is also applicable to a multi-piece wheel. One type of multi-piece wheel is a full face modular wheel 130 illustrated in a sectional view in FIG. 13 as having a circular cast wheel disk 131 attached to a conventionally formed partial wheel rim 132. The wheel disk 131 is cast in a wheel disk mold (not shown) from one of the light weight metals or metal alloys described above. A preform (not shown) formed from one of the reinforcing materials described above is secured within the wheel disk mold. The preform is shaped to form a MMC reinforcing layer 133 upon an inner surface 134 of the wheel disk 131. The MMC layer 133 strengthens the wheel disk 131, allowing a reduction in the wheel disk thickness and thereby reducing the total wheel weight. Because the partial wheel rim 132 is formed separately from the wheel disk, the reinforcing layer does not extend onto the wheel rim 132. However, a MMC reinforcing layer can be included in the partial wheel rim 132 (not shown) as described above.

Figure 14:
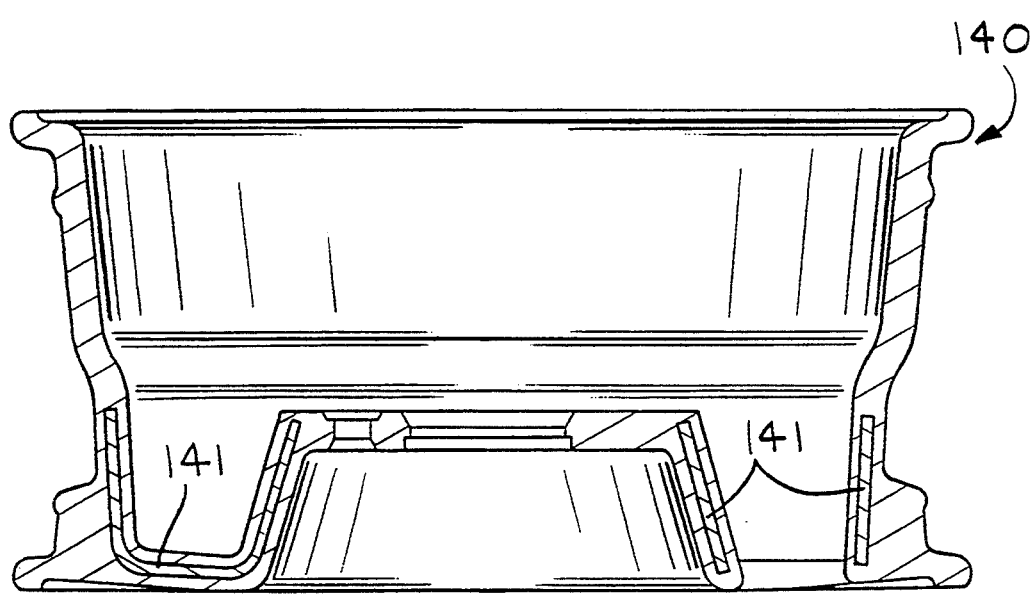
FIG. 14 is a sectional view of a cast wheel formed in accordance with this invention to include an imbedded layer of reinforcing material.

While the above described embodiments have illustrated MMC reinforcing layers formed on inner wheel surfaces, it is to be appreciated that the MMC reinforcing layer can be embedded within the wheel. An improved cast wheel 140 having a MMC reinforcing layer 141 embedded therein is illustrated in FIG. 14. All the surfaces of the improved wheel 140 consist of the casting metal and can be easily machined, while the MMC layer 141 increases the strength of the wheel 140, allowing a reduction in wheel thickness and weight.

Figure 15:
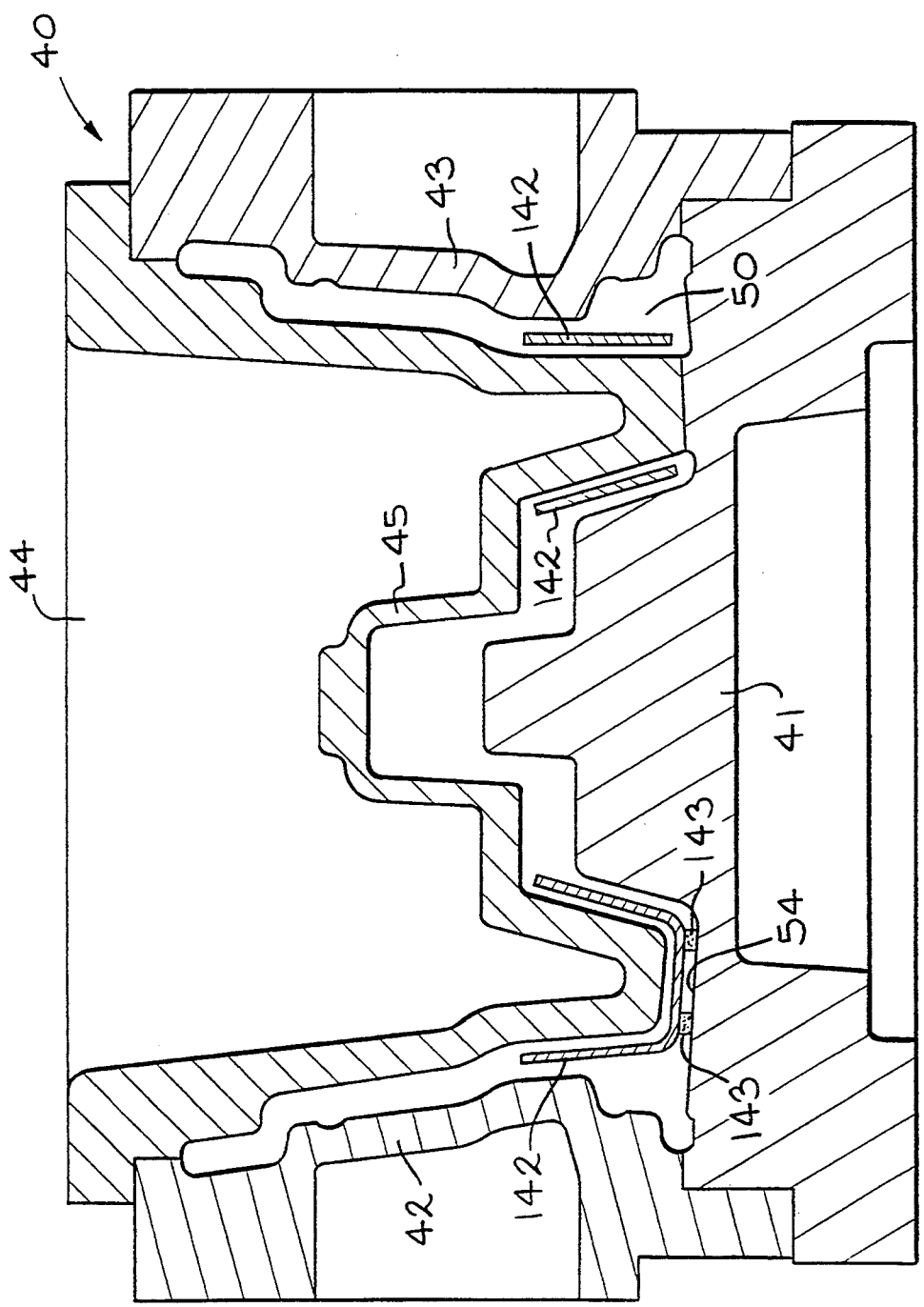
FIG. 15 is a sectional view of a mold and a preform used to cast the wheel shown in FIG. 14.

A means for forming the cast wheel 140 with an embedded MMC layer is illustrated in FIG. 15. The multipiece mold assembly 40 shown in FIG. 15 is similar to the mold assembly described above and has corresponding parts identified by the same numeric designators. A preform 142, formed from a reinforcing material and having a shape similar to the preform 65 described above, is secured within the mold cavity 50 by a plurality of spacer blocks 143. The spacer blocks 143 are formed from a material, such as styrofoam, that vaporizes upon contact with the molten metal. While the spacer blocks 143 are shown as being placed between the preform 142 and the disk cavity outer surface 54, it will be appreciated that the blocks can be placed between the preform 142 and other cavity surfaces. The size of the spacer blocks 143 is selected such that the preform 142 does not contact any mold cavity surfaces, allowing the molten casting metal to flow into the spaces between the preform 142 and the mold cavity surfaces. This causes the resulting MMC layer 141 to be fully embedded within the cast wheel 140.

Figure 16:
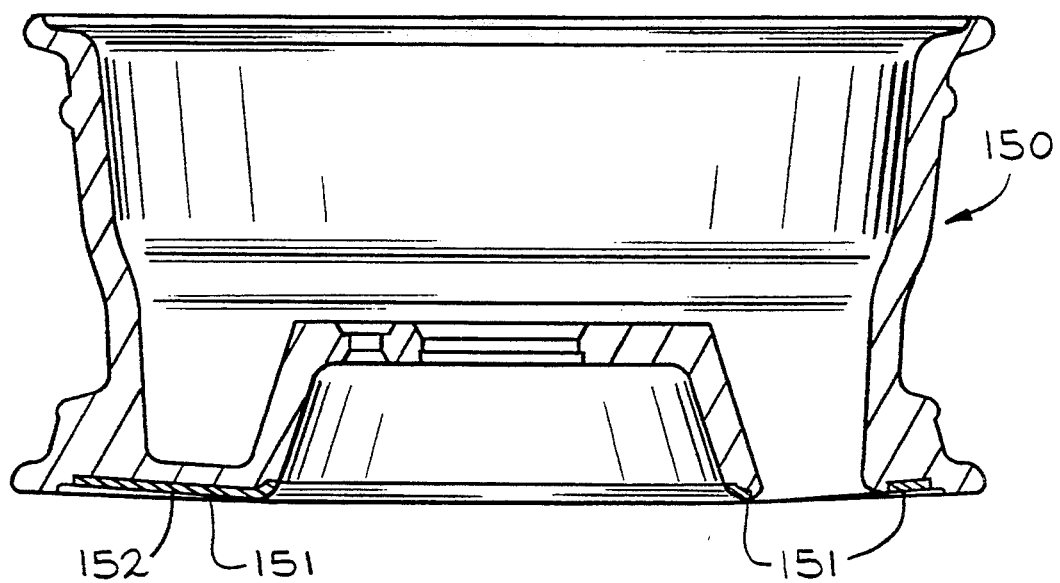
FIG. 16 is a sectional view of a cast wheel formed in accordance with this invention to include an exterior surface layer of reinforcing material.

The MMC reinforcing layer also can be formed upon an exterior surface of the wheel casting. An improved cast wheel 150 having a MMC reinforcing layer 151 forming a portion of a wheel disk outer surface 152 is illustrated in FIG. 16. The MMC layer 151 increases the strength of the wheel 150, allowing a reduction in wheel thickness and weight.

Figure 17:
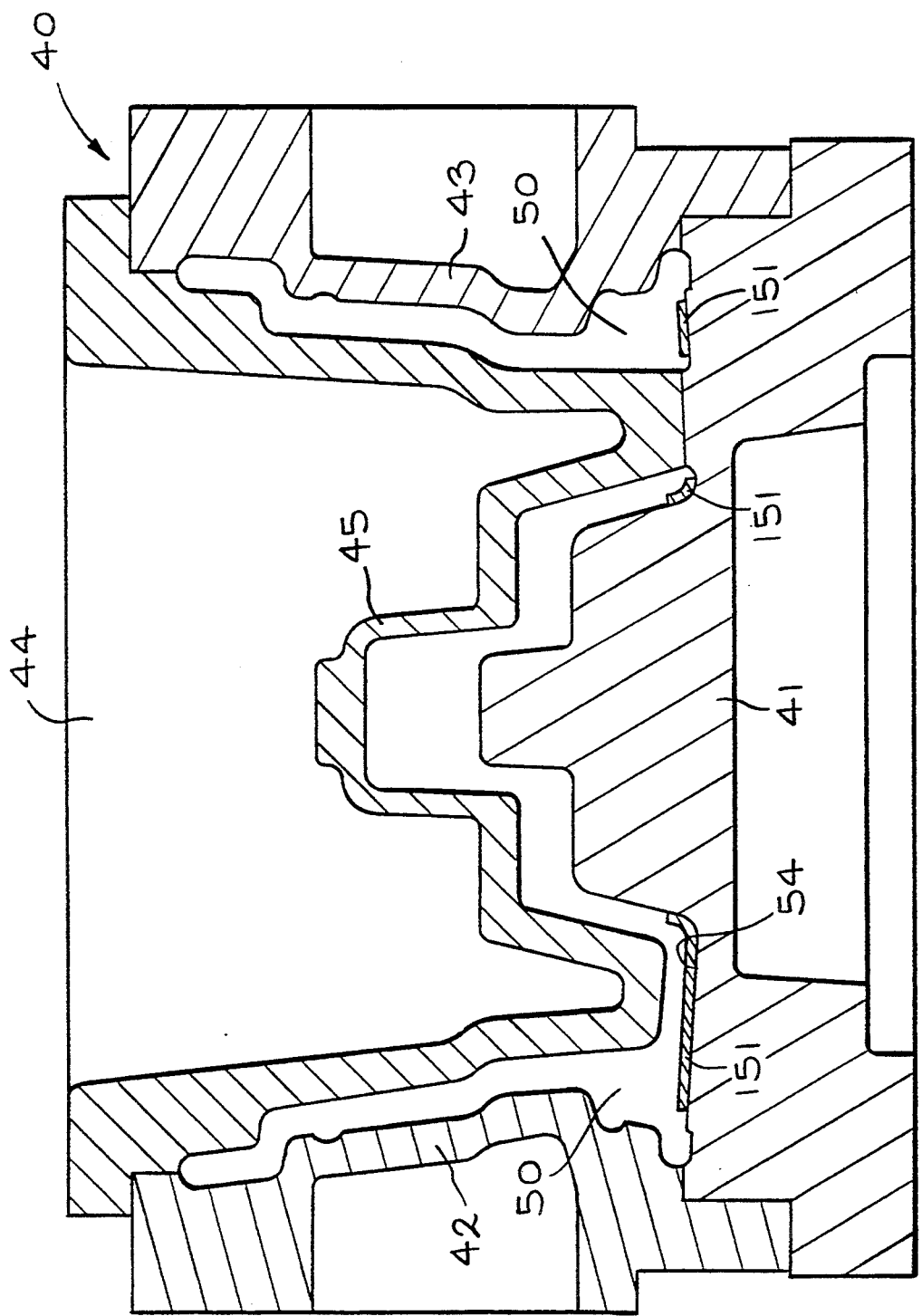
FIG. 17 is a sectional view of a mold and a preform used to cast the wheel shown in FIG. 16.

A means for forming the cast wheel 150 with an external MMC layer is illustrated in FIG. 17. As above, the multipiece mold assembly 40 shown in FIG. 17 is similar to the mold assembly described above and has corresponding parts identified by the same numeric designators. A preform 151, formed from a reinforcing material and having a generally disk shape, is secured directly to the disk cavity outer surface 54. Upon casting the wheel 150, the molten casting metal flows completely over the preform 151 and impregnates and wets the preform reinforcing layer as described above to form an outer layer of MMC reinforcing material.

In accordance with the provisions of the patent statutes, the principle and mode of operation of the invention have been explained and illustrated in its preferred embodiments. However, it must be understood that this invention may be practiced otherwise than as specifically explained and illustrated without departing from its spirit or scope. For example, the particular features of the structure of each embodiment of the invention described above can be combined to form further embodiments. Thus, a MMC layer can be formed only on the inner surface of the wheel rim 11, and not on the inner surface of the wheel disk 12.

What is claimed is:

1. A vehicle wheel comprising a cast body formed from a metal alloy, said cast body including a predetermined portion formed from a metal matrix composite, said metal matrix composite reinforcing said cast body and including a porous nonmetallic reinforcing material which is permeated by said metal alloy.

2. A vehicle wheel, as defined in claim 1, wherein said predetermined portion forms a reinforcing layer within said east body.

3. A vehicle wheel, as defined in claim 2, wherein said cast body defines a surface and a portion of said surface includes said reinforcing layer.

4. A vehicle wheel, as defined in claim 3, wherein said surface is an interior surface of said cast body.

5. A vehicle wheel, as defined in claim 3, wherein said surface is an exterior surface of said cast body.

6. A vehicle wheel, as defined in claim 2, wherein said reinforcing layer is embedded within said cast body.

7. A vehicle wheel, as defined in claim 1, wherein said porous nonmetallic reinforcing material is a porous material selected from the group consisting of silicon carbide, alumina, silica and graphite.

8. A vehicle wheel, as defined in claim 7, wherein said reinforcing material includes fibers.

9. A vehicle wheel, as defined in claim 7, wherein said reinforcing material includes whiskers.

10. A vehicle wheel, as defined in claim 7, wherein said reinforcing material includes particulates.

11. A vehicle wheel, as defined in claim 7, wherein said reinforcing material includes foam.

12. A vehicle wheel, as defined in claim 1, wherein said cast body is cast from a metal selected from the group consisting of aluminum, magnesium and titanium.

13. A vehicle wheel, as defined in claim 1, wherein said cast body includes a circular wheel disk and said metal matrix composite forms a portion of said wheel disk.

14. A vehicle wheel, as defined in claim 13, wherein said cast body further includes an annular wheel rim and said metal matrix composite extends form said wheel disk to form a portion of said wheel rim.

15. A vehicle wheel, as defined in claim 14, wherein said cast body includes an inner surface and said cast body further includes an annular recess formed in said inner surface adjacent to the junction of said wheel disk and said wheel rim, and further wherein said metal matrix composite extends from said wheel disk across said recess to said wheel rim.

16. A vehicle wheel, as defined in claim 1, wherein said cast body includes an annular wheel rim and said of metal matrix composite forms a portion of said wheel rim.

* * * * *